(12) United States Patent
Thangyah

(10) Patent No.: US 10,989,075 B2
(45) Date of Patent: Apr. 27, 2021

(54) EMISSION REDUCING LOUVERS

(71) Applicant: Mitsubishi Hitachi Power Systems Americas, Inc., Lake Mary, FL (US)

(72) Inventor: Schwartz Thangyah, Sanford, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 225 days.

(21) Appl. No.: 16/148,525

(22) Filed: Oct. 1, 2018

(65) Prior Publication Data

US 2020/0102855 A1 Apr. 2, 2020

(51) Int. Cl.
*F01D 25/30* (2006.01)
*F02C 6/18* (2006.01)
(Continued)

(52) U.S. Cl.
CPC ............. *F01D 25/30* (2013.01); *F01D 25/12* (2013.01); *F01K 23/10* (2013.01); *F01K 23/101* (2013.01); *F01N 3/0214* (2013.01); *F01N 3/0215* (2013.01); *F01N 13/002* (2013.01); *F01N 13/017* (2014.06); *F01N 13/08* (2013.01);
(Continued)

(58) Field of Classification Search
CPC .......... F01D 25/30; F01D 25/12; F01K 23/10; F01K 23/101; F01K 23/105; F01K 23/106; F01N 3/0214; F01N 3/0215; F01N 3/021; F01N 3/031; F01N 2450/30; F01N 2260/00; F01N 2260/022; F01N 2270/00; F01N 2270/02; F01N 2250/02; F01N 2250/10; F01N 2250/14; F01N 2240/04; F01N 13/00; F01N 13/011; F01N 13/017; F01N 2410/00; F01N 2410/02; F01N 2410/06; F01N 2410/08; F01N 2410/10; F01N 2900/1404; F01N 3/103; F01N 2290/00; F01N 2290/06; Y02E 20/16; Y02T 10/24; F02C 9/18; F02C 6/18

See application file for complete search history.

(56) References Cited

U.S. PATENT DOCUMENTS 4,131,432 A * 12/1978 Sato ................... B01D 53/8625
422/177
4,698,078 A * 10/1987 Mavros .................. B01D 46/10
55/313
(Continued)

FOREIGN PATENT DOCUMENTS

JP 63085207 A * 4/1988 ............. F01K 23/10

*Primary Examiner* — Alain Chau
(74) *Attorney, Agent, or Firm* — Schwegman Lundberg & Woessner, P.A.

(57) ABSTRACT

An emissions reduction system for a combined cycle power plant having a gas turbine engine and a heat recovery steam generator (HRSG) can comprise a duct defining a flow space configured to receive exhaust gas from the gas turbine and convey the exhaust gas into the HRSG, and a louver system coupled to the duct that can comprise a plurality of emission medium panels extending across the flow space, the emission medium panels configured to be moved between a first position where adjacent filter medium panels extend contiguously across the flow space of the duct and a second position where adjacent filter medium panels include spaces therebetween to provide an unobstructed flow path and an actuator to move the plurality of panels between the first position and the second position.

20 Claims, 7 Drawing Sheets

(51) Int. Cl.
  *F01N 13/00*   (2010.01)
  *F01K 23/10*   (2006.01)
  *F01D 25/12*   (2006.01)
  *F01N 3/021*   (2006.01)
  *F01N 13/08*   (2010.01)
  *F01N 3/10*    (2006.01)
  *F01N 3/20*    (2006.01)

(52) U.S. Cl.
  CPC ............... *F02C 6/18* (2013.01); *F01N 3/103* (2013.01); *F01N 3/2066* (2013.01); *F01N 2260/022* (2013.01); *F01N 2290/06* (2013.01); *F05D 2220/32* (2013.01); *F05D 2220/72* (2013.01); *F05D 2260/232* (2013.01); *F05D 2270/082* (2013.01)

(56) References Cited

U.S. PATENT DOCUMENTS

| | | | | |
|---|---|---|---|---|
| 4,820,492 | A * | 4/1989 | Wada | B01D 53/8625 |
| | | | | 422/111 |
| 4,829,938 | A * | 5/1989 | Motai | F22B 37/008 |
| | | | | 122/7 R |
| 5,002,121 | A * | 3/1991 | von Erichsen | F22B 35/007 |
| | | | | 137/875 |
| 5,267,434 | A * | 12/1993 | Termuehlen | F01K 23/10 |
| | | | | 122/7 R |
| 5,762,885 | A * | 6/1998 | Debbage | B01D 53/8696 |
| | | | | 422/171 |
| 6,919,050 | B2 * | 7/2005 | Hettwer | F22B 1/1815 |
| | | | | 422/168 |
| 7,107,774 | B2 * | 9/2006 | Radovich | F01K 13/02 |
| | | | | 122/7 B |
| 7,951,346 | B2 * | 5/2011 | Girdlestone | B01J 23/38 |
| 9,399,927 | B2 | 7/2016 | Mcdeed et al. | |
| 9,541,030 | B2 * | 1/2017 | Baruzzini | F02K 1/46 |
| 10,077,694 | B2 * | 9/2018 | Davis, Jr. | F02C 6/18 |
| 10,655,516 | B2 * | 5/2020 | Kulkarni | F01N 3/0211 |
| 10,655,517 | B2 * | 5/2020 | Kulkarni | F01N 3/0215 |
| 10,655,518 | B2 * | 5/2020 | Kulkarni | F01N 3/035 |
| 10,662,840 | B2 * | 5/2020 | Kulkarni | F01D 25/305 |
| 10,662,841 | B2 * | 5/2020 | Kulkarni | F01K 7/16 |
| 2005/0034445 | A1 * | 2/2005 | Radovich | F01K 23/10 |
| | | | | 60/39.182 |
| 2005/0150229 | A1 * | 7/2005 | Baer | F02C 7/12 |
| | | | | 60/772 |
| 2010/0064655 | A1 * | 3/2010 | Zhang | F01K 23/101 |
| | | | | 60/39.5 |
| 2011/0036066 | A1 * | 2/2011 | Zhang | F01D 25/305 |
| | | | | 60/39.5 |
| 2014/0090354 | A1 * | 4/2014 | Scipio | F02K 1/38 |
| | | | | 60/39.5 |
| 2014/0360154 | A1 * | 12/2014 | Benz | F22B 35/001 |
| | | | | 60/39.52 |
| 2016/0376959 | A1 * | 12/2016 | Davis, Jr. | F02C 6/18 |
| | | | | 60/39.5 |
| 2018/0230849 | A1 * | 8/2018 | Kippel | F02C 9/20 |
| 2018/0238211 | A1 | 8/2018 | Kulkarni et al. | |
| 2018/0238212 | A1 * | 8/2018 | Kulkarni | F01N 3/0215 |
| 2018/0238213 | A1 * | 8/2018 | Kulkarni | F01D 25/305 |
| 2018/0238214 | A1 * | 8/2018 | Kulkarni | F02C 6/18 |
| 2018/0238215 | A1 * | 8/2018 | Kulkarni | F01N 3/0211 |
| 2018/0347407 | A1 * | 12/2018 | Mohr | F01K 13/003 |

\* cited by examiner

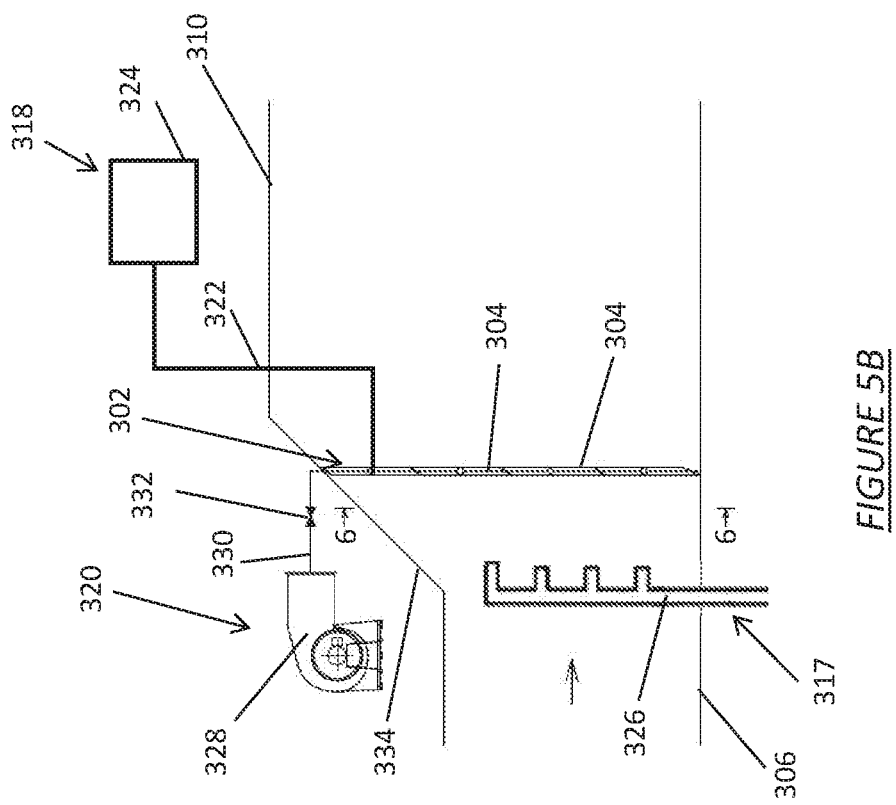
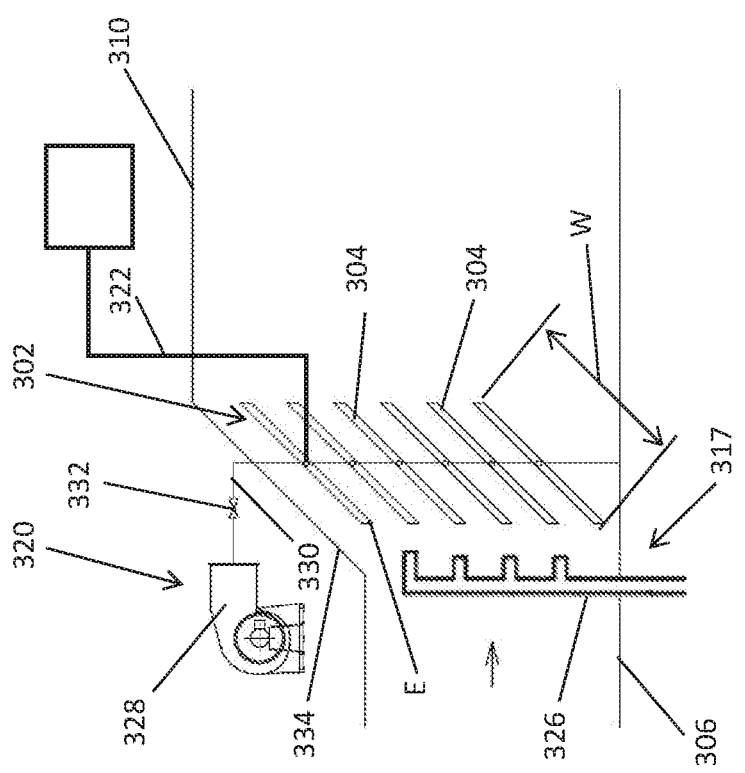

EMISSION REDUCING LOUVERS

TECHNICAL FIELD

The present disclosure relates generally to power plants, such as combined cycle power plants. More particularly, the present disclosure relates to systems and methods for reducing start-up or low load emissions in a power plant including a gas turbine engine and a downstream heat sink.

BACKGROUND

Combined cycle power plants can employ a gas turbine system and a steam turbine system o generate power. In order to be permitted by various governmental agencies, power plant operators can be required by environmental regulations to meet emissions limits over the full operational range of the combined cycle power plant. Environmental regulations can limit the amounts of nitrogen dioxide (NOx) and/or carbon monoxide (CO) emitted by the gas turbine system during low load operations such as during start-up of the power plant and during full load operations such as during peak energy demand situations.

In order to comply with these environmental regulations and other considerations, combined cycle power plants can incorporate various emissions control systems. Gas turbine emissions can be typically controlled by two systems that chemically interact with exhaust gas of a gas turbine system. First, the exhaust gas can be passed through a CO catalyst system to oxidize CO from the exhaust gas into carbon dioxide ($CO_2$), as well as oxidizing volatile organic compounds (VOCs). Second, a selective catalytic reduction (SCR) system can convert NOx in the exhaust gas to nitrogen and water by causing the exhaust gas to react with a reducing agent, such as anhydrous ammonia, aqueous ammonia or urea. However, during low load conditions of a combined cycle power plant, for example, the SCR system and the CO catalyst system may not be active because they may not attain the operating temperature of the emission controls systems. Furthermore, even when operating at high load conditions, it can take an amount of time before the emission control systems heat up to the operating temperature. These situations can arise because the emission control systems are typically located after various heat exchanger elements within a heat recovery steam generator (HRSG), such as a superheater within the HRSG or a high pressure (HP) drum, which can act as a heat sink inhibiting warming of the emissions control systems. For example, from start-up it can take more than 30 minutes for traditional emission control systems to reach sufficient operating temperatures to start reducing NOx and CO emissions. In such a scenario, exhaust gas can exit to atmosphere from the HRSG without adequate or any emission reductions. As such, the power plant can emit undesirably high levels of NOx and/or CO emissions during the start-up procedure. These high levels of emissions are typically counted against limits under government issued permits, which can have different limits for start-ups, high load operations and overall yearly operation. Unduly high start-up emissions can therefore require later offsetting by more efficient operation at high load conditions, which in and of itself introduces new operating constraints and costs.

In order to address CO emissions, additional CO catalysts have been positioned upstream of a superheater, but such structure places further limitations on the power plant during full load operation. In another approach, the load of the gas turbine system is quickly raised from startup to a point where emissions are lower, which can he referred to as a 'rapid response' start-up. However, this approach adds more equipment and complex control systems to the power plant.

Examples of emission control systems in gas turbine systems are described in U.S. Pat. No. 9,399,927 to McDeed et al. and U.S. Pub. No. 2018/0238211 to Kulkarni et al.

OVERVIEW

The present inventors have recognized, among other things, that a problem to be solved can include reducing emissions during start-up or low load procedures of gas turbine engines and systems used in combined cycle power plants. The present inventors have recognized that existing systems and methods for reducing emissions at start-up introduce mechanical, operational and safety issues that can outweigh any benefits of reduced emissions at start-up. For example, the present inventors have recognized that proposed systems for selectively inserting emission converters or emission medium panels into the exhaust gas stream of the gas turbine during start-up and then withdrawing the emission medium panels during high load operations can introduce overly complex insertion and withdrawal mechanisms that are difficult to seal, thereby producing leakage problems that potentially produce emissions and safety issues, as is discussed in greater detail below. As used herein, "emission converter" or "emission medium panel" indicates all or part of any form of exhaust toxin removing or reducing system, including without limitation, catalyst structures. The emission medium panel can remove different forms of toxins and take on a variety of structural forms.

The present subject matter can help provide a solution to this problem, such as by providing louver systems including emission medium panels that can selectively interact with exhaust gas flow from a gas turbine engine or system, without having to be withdrawn from ducting for the power plant. The emission medium panels can be positioned upstream of a heat recovery steam generator (HRSG), such as within an inlet duct of the HRSG, to facilitate the emission medium panels rapidly achieving operating temperatures. After the HRSG has achieved operating temperatures sufficient to activate emission control units located therein, for example, the louver systems can be operated to rotate the emission medium panels to reduce their exposure to incoming exhaust gas. In such configurations, the emission medium panels can remain stationary relative to their location in the system, thereby improving the ability to seal around the emission medium panels. Furthermore, actuations mechanisms for the emission medium panels can be simple and easy to implement and seal.

In an example, an emissions reduction system for a combined cycle power plant having a gas turbine engine and a heat recovery steam generator (HRSG) can comprise a duct defining a flow space configured to receive exhaust gas from the gas turbine and convey the exhaust gas into the HRSG, and a louver system coupled to the duct that can comprise a plurality of emission medium panels extending across the flow space, the emission medium panels configured to be moved between a first position where adjacent filter medium panels extend contiguously across the flow space of the duct and a second position where adjacent filter medium panels include spaces therebetween to provide an unobstructed flow path and an actuator to move the plurality of panels between the first position and the second position.

In another example, a method for controlling emissions during low load conditions of a gas turbine engine used in a combined cycle power plant can comprise starting the gas turbine engine that generates an exhaust gas flow, directing the exhaust gas flow of the gas turbine engine through a primary passage of an exhaust duct coupled to a heat recovery steam generator (HRSG), closing a plurality of emission medium louvers to a closed state to increase exposure of the plurality of emission medium louvers to the exhaust gas flow, attaining a threshold operation parameter of the combined cycle power plant, and opening the plurality of emission medium louvers to an open state to decrease exposure of the plurality of emission medium louvers to the exhaust gas flow.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 5A is a schematic view of a transition duct of a heat recovery steam generator incorporating horizontally mounted emission louvers of the present application in an open state.

FIG. 5B is a schematic view of a transition duct of a heat recovery steam generator incorporating horizontally mounted emission louvers of the present application in a closed state.

Figure 1:
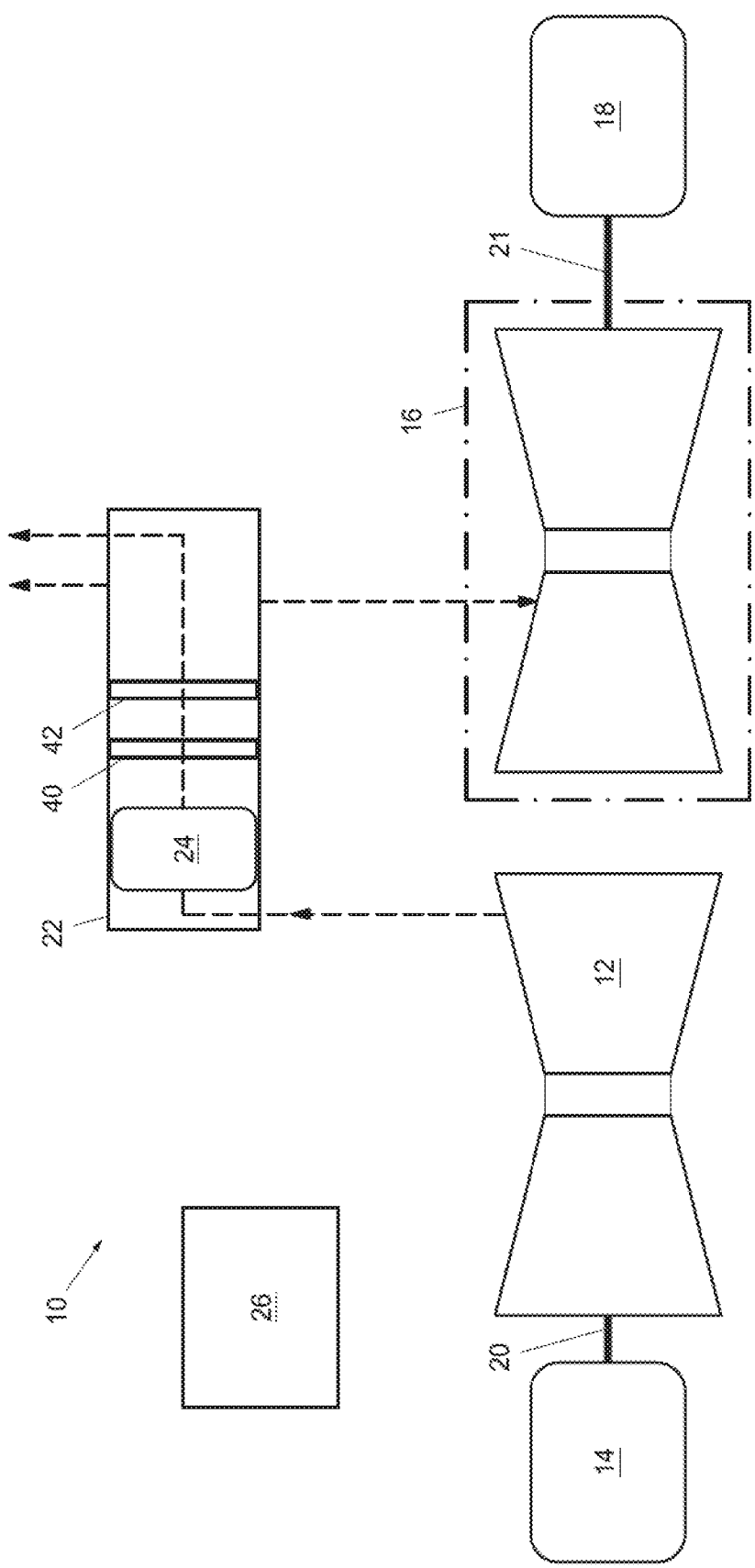
FIG. 1 is a schematic diagram of a conventional combined cycle power plant.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of combined cycle power plant 10 comprising gas turbine system 12, electric generator 14, steam turbine system 16 and electric generator 18. In the illustrated example, power plant 10 comprises a multi-shaft system with two generators, but can have other configurations. Gas turbine system 12 can be operably coupled to generator 14 via shaft 20. Steam turbine system 16 can be operably coupled to generator 18 via shaft 21. Combined cycle power plant 10 can also include heat recovery steam generator (HRSG) which can be operably connected to gas turbine system 12 and steam turbine system 16. HRSG 22 can be fluidly connected to both gas turbine system 12 and steam turbine system 16 via conventional conduits. HRSG 22 can include superheater 24, CO catalyst system 40 and selective catalytic reduction (SCR) system 42, but can have other configurations.

Figure 2:
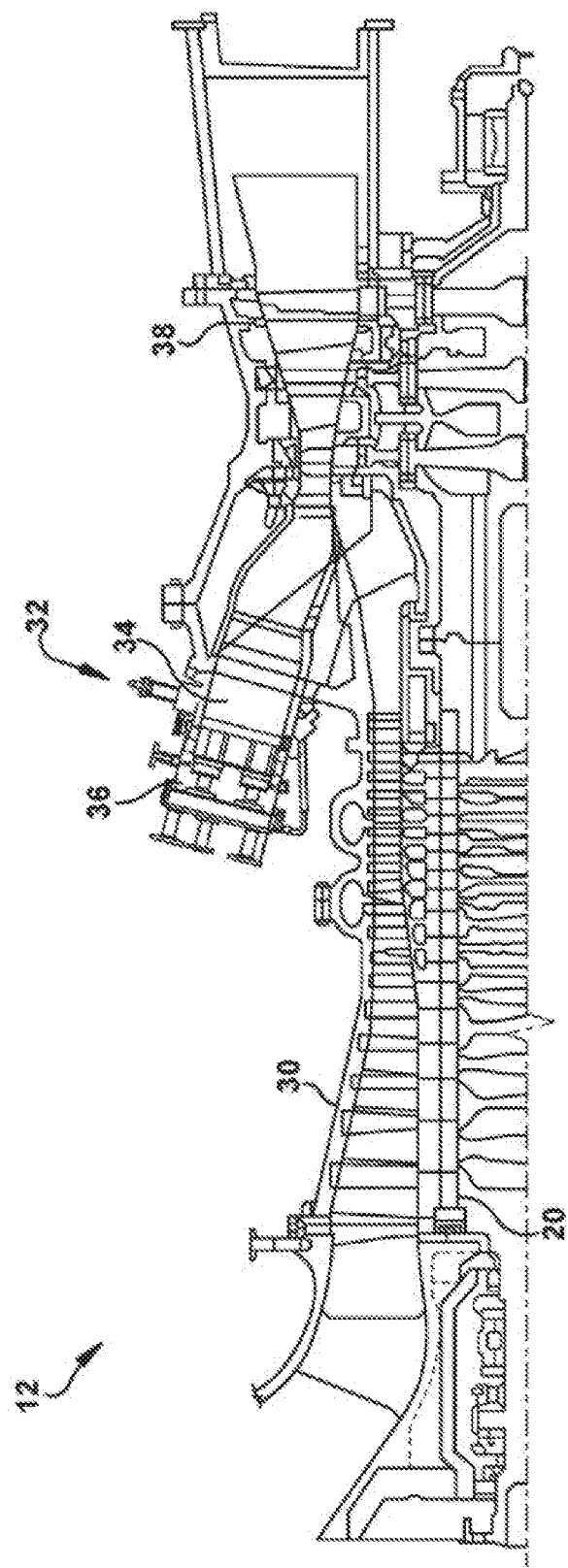
FIG. 2 is a cross-sectional view of a conventional gas turbine system.

FIG. 2 is a cross-sectional view of an embodiment of gas turbine system 12 of FIG. 1. Gas turbine system 12 can comprise compressor 30 and combustor 32. Combustor 32 can include combustion region 34 and fuel nozzle assembly 36. Gas turbine system 12 can also include gas turbine 38, which can be coupled to compressor 30 via common shaft 20. In operation, air can enter the inlet of compressor 30, can be compressed and then discharged to combustor 32 where fuel, such as a gas, e.g., natural gas, or a fluid, e.g., oil, is burned to provide high energy combustion gases that can drive gas turbine 38. In gas turbine 38, the energy of the hot gases is converted into work at shaft 20. Shaft 20 can be used to drive compressor 30 and other loads such as generator 14 to produce electricity.

Returning to FIG. 1, the energy in the exhaust gases (dashed line) exiting gas turbine system 12 can be converted into additional useful work in HRSG 22. The exhaust gases can enter HRSG 22, in which water can be converted to steam in the manner of a boiler for operation of steam turbine 16. Within HRSG 22, superheater 24 can be provided to superheat the steam using the exhaust and optionally another heat source prior to the steam entering steam turbine system 16, e.g., at a high pressure (HP) turbine thereof. Steam turbine system 16 can include one or more steam turbines, e.g., a high pressure (HP) turbine, an intermediate pressure (IP) turbine and a low pressure (LP) turbine, each of which can be coupled to shaft 21. Each steam turbine can include a plurality of rotating blades (not shown) mechanically coupled to shaft 21. In operation, steam from various parts of HRSG 22 can enter an inlet of at least one of the steam turbines, and can be channeled to impart a force on blades thereof causing shaft 21 to rotate. Steam from an upstream turbine may be employed later in a downstream turbine. Work can be extracted from steam turbine system 16 to drive shaft 21 and an additional load such as generator 18 to produce additional electric power. A conventional power plant control system 26 can control the above-described components.

Governmental agencies have required combined cycle power plants to meet environmental emissions limits over a large load range, which can produce challenges relating to gas turbine system operations, For example, environmental emissions limits can set maximum emissions for nitrogen dioxide (NOx) and carbon monoxide (CO) during low load operations such as during start-up of the system, In particular, during start-up of gas turbine system 12, a number of operational characteristics create relatively high NOx and/or CO emissions. In one example, gas turbine system exhaust may be at about 370° C. at start-up (approximately 5%-20% load) to allow HRSG warmup that accommodates traditional thermal stress mitigation, mating of steam temperature with an ideal for steam turbine system start, reheat pressure reduction for steam turbine system start (HP turbine section) and gas turbine system fuel heating.

During normal higher load operation, emissions are typically controlled in a gas turbine system by two emission control systems. First, as shown in the prior art system of FIG. 1, the exhaust may be passed through CO catalyst system 40 within HRSG 22 to oxidize CO to CO2, as well as oxidizing VOCs. Second, a selective catalytic reduction (SCR) system 42 within HRSG 22 converts NOx to nitrogen and water by causing the exhaust (right dashed line) to react with a reducing agent, e.g., anhydrous ammonia, aqueous ammonia or urea. Systems 40 and 42 may be interspersed within various heat transfer piping sets of HRSG 22. During low load conditions, SCR system 42 and CO catalyst system 40 are not active because they do not attain the desired operating temperature, for example, because they are located after superheater 24 (FIG. 1) or an HP drum (not shown). For example, at startup it can take more than 30 minutes for the traditional systems 40 and 42 to reach sufficient operating temperatures to start reducing NOx and CO emissions. In this case, exhaust (left dashed line) may exit to atmosphere from HRSG 22 without emission control. During this initial period, power plant 10 may continue to emit NOx and CO emissions which are counted against the permit limits for start-up and overall yearly tons limit.

Previous attempts at reducing emissions during start-up have employed one or more emissions converters that can be located immediately after the gas turbine system and upstream of a HRSG directly within the exhaust duct of the gas turbine system. These emission reduction systems may be permanently mounted in the main exhaust path if the gas turbine exhaust temperature is relatively low during all operation conditions or can use a retraction system for selectively moving the emission converter from a first location within an exhaust path within the exhaust duct and a second location outside of the exhaust path outside of the exhaust duct, The emission converters can thus be employed in the first location upstream of the HRSG where sufficient temperatures can be reached to activate the emission converters during start-up or other low load conditions, and can be retracted out of the exhaust path during higher loads at which threshold operation parameters of the power plant can be obtained, such as temperatures capable of activating emissions converters downstream in the HRSG are reached, Additionally, the emission converter upstream of the HRSG can be retracted to avoid undesirable exhaust flow restrictions at the higher load conditions and excessive temperatures that may be detrimental to catalyst useful operating life. As discussed further below, these systems can be difficult to implement and maintain and can result in exhaust gas leakage that can produce emission issues and safety hazards.

Figure 3:
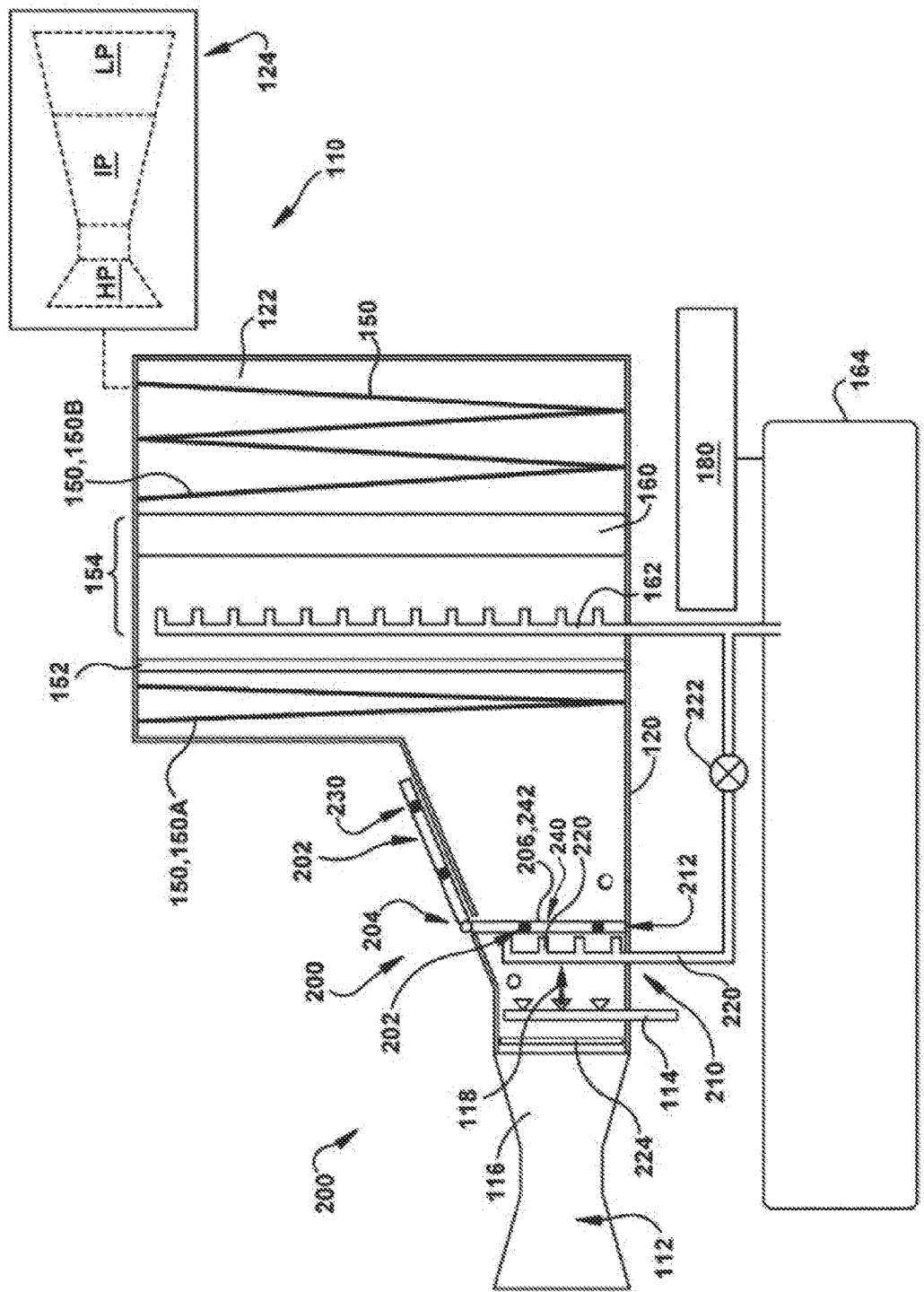
FIG. 3 is a cross-sectional view of a prior art emission reduction system incorporating a moveable start-up emissions converter.

FIG. 3 is a cross-sectional view of combined cycle power plant 110 including gas turbine system 112 operatively coupled to HRSG 122. Gas turbine system 112 can include one or more of any conventional combustion-based gas turbine engines. Gas turbine system 112 can also include conventional duct burner 114 downstream of turbine 116, which can burn any residual fuel in exhaust 118 exiting turbine 116. Exhaust 118 can include a variety of combustion byproducts such as carbon dioxide, carbon monoxide (CO), nitrogen oxide (NOx), Volatile Organic Compounds (VOCs) and the like. Exhaust 118 can pass through exhaust passage 120 operatively coupled to gas turbine 116 and configured to direct exhaust 118 downstream of gas turbine 116, such as to HRSG 122. Exhaust passage 120 can be an integral part of HRSG 122, or can be a separate passage upstream but operatively coupled to HRSG 122. Exhaust passage 120 defines an exhaust path through which exhaust 118 passes.

HRSG 122 can be operably coupled to exhaust passage 120 of gas turbine 116 for generating stea.m for stea.m turbine 124, which is shown schematically in phantom in FIG, 3. HRSG 122 can include a steam generating heat exchanger and can include heating pipes 150 through which water and/or steam can be passed to form steam or further heat steam. For example, HRSG 122 can include pipes 150 that can function as conventional parts of an HRSG such as but not limited to: superheater(s), economizer(s) and reheat section(s) for any number of steam turbine stages HP, IP and/or LP). Any conventional steam or boiler drums (not shown) can also be provided as part of HRSG 122. HRSG 122 can also include any necessary piping or valving (not shown) to deliver water/steam, as necessary. HRSG 122 can also include bypass systems, valves, and attemperators to operate in fast-start and fast-ramp modes. HRSG 122 can also include a conventional carbon monoxide (CO) catalyst 152 downstream of a first set of heat exchange pipes 150A. CO catalyst 152 can include a CO catalytic material capable of carrying out the desired catalytic conversion of CO to carbon dioxide (CO2) or other less toxic pollutants in a conventional manner. HRSG 122 can also include a conventional selective catalytic reduction (SCR) system 154. SCR system 154 can convert NOx to nitrogen, water and carbon dioxide by causing the exhaust to react with a reducing agent, e.g., anhydrous ammonia, aqueous ammonia or urea. SCR system 154 can include a conventional SCR 160 and an SCR reducing agent injector 162, such as an ammonia injection grid (AIG), upstream of SCR 160, for example. SCR 160 can include porous catalyst material. HRSG 122 can also have a combined SCR-CO catalyst instead of two separate catalysts. SCR reducing agent injector 162 can include any now known or later developed injector system such as an array of nozzles, sprayers, etc., capable of coating SCR 160 with reducing agent. SCR reducing agent injector 162 can be coupled to any form of reductant delivery system 164 for delivery of an air flow to entrain reducing agent therein. Power plant controller 180 can be employed to control the afore-described components.

FIG. 3 also shows an emission reduction system 200 (hereinafter "ER system 200") for power plant 110. ER system 200 can comprise reductant delivery system 164, emission converter 202, reducing agent injector 220 and one or more panels 240 for power plant 110 according to previous designs.

In one embodiment, emission converter 202 can take the form of SCR 206 of SCR system 210 sized for first location 212 within exhaust passage 120. More specifically, emission converter 202 can include a SCR catalyst medium. For example, SCR 206 can include a metal oxide or zeolite based porous catalyst. First location 212 can be upstream of HRSG 122,and emission converter 202 (such as SCR 206) can span exhaust passage 120 and thus the exhaust path. Emission converter 202 can be smaller than conventional SCR 160 in HRSG 122 due to the size of exhaust passage 120 just downstream of gas turbine 116 compared to HRSG 122, SCR system 210 can also include SCR reducing agent injector 220, which can include an injector system such as an array of nozzles, sprayers, etc., capable of coating SCR 206 with reducing agent. SCR reducing agent injector 220 can be upstream of first location 212 of the exhaust passage. In one embodiment, SCR reducing agent injector 220 can be permanently mounted within exhaust passage 120, e.g., injector 220 can include metal piping and nozzles capable of withstanding the higher load temperatures of gas turbine 116. SCR reducing agent injector 220 can be coupled to any form of reducing agent delivery system. In the example shown, SCR. reducing agent injector 220 can be provided as an ad.d-on to reductant delivery system 164. In this case, SCR reducing agent injector 220 can be operatively coupled, e.g., via valves 222 and conduits (not numbered), to reductant delivery system 164. In alternative embodiments, SCR reducing agent injector 220 can be coupled to its own standalone, and smaller, reducing agent delivery system, which would be structured similarly to system 164 without coupling to parts in HRSG 122. Controller 180 can be configured, e.g., via hardware and/or software modifications, to control valve 222 that delivers reducing agent to injector 220. In operation, the reducing agent is injected onto SCR 206, and exhaust 118 passes through the SCR. As exhaust 118 passes through, the NOx reacts with the reducing agent and reduces NOx to nitrogen, water and carbon dioxide, which then may be exhausted to atmosphere or otherwise used for heat recovery in a conventional manner downstream of ER system 200.

ER system 200 can also include flow distributor 224 prior to emission converter 202 to distribute the exhaust flow properly and avoid exhaust flow start-up system, which may be an issue during startup or low load conditions as the flow coming into ER system 200 is approximately 5%-20% of the design flow and the exhaust velocity profile may not be uniform. Flow distributor 224 can include a perforated disc or some other design to distribute the flow properly, e.g., uniformly. Such flow distributor 224 is only shown relative to FIG. 3 for clarity, but can also be part of any ER system arrangement described herein.

In another embodiment, emission converter 202 can take the form of a carbon monoxide (CO) catalyst through which exhaust 118 passes to remove carbon monoxide (CO) from exhaust 118 of gas turbine 116.

Emission converter 202 can take the form of combined SCR/CO catalyst 242. In this embodiment, emission converter 202 can include both SCR layers and CO catalyst layers, and is functional to remove both NOx and CO.

Retraction system 204 can be operably coupled to exhaust passage 120 of gas turbine 116, and can be operable to selectively move emission converter 202 between first location 212 within the exhaust path inside ducting for exhaust passage 120 and second location 230 out of the exhaust path outside ducting for exhaust passage 120. ER system 200 can temporarily position emission converter 202 just downstream of gas turbine 116 exhaust outlet and/or upstream of HRSG 122, for emission reduction at low loads or start-up conditions, and remove the emission converter 202 once operations move to higher loads and/or when the exhaust temperature exceeds the design temperature of emission converter 202.

The present inventors have recognized that problems associated with embodiments of emission reduction system 200 of FIG. 3 can include increased wear and damage of emission converter 202. For example, movement of emission converter 202 between the extended and retracted positions can damage the catalysts due to shaking, bumping and changing of the orientation. Additionally, movement of emission converter 202 can require complicated and expensive motion control devices in order to enable movement in the desired manner, while also attempting to minimize damage of emission converter 202 during movement. Also, moving emission converter 202 in and out of ductwork can compromise the integrity of sealing arrangements on the ductwork. Furthermore, exhaust gas and emissions can leak out of the combined cycle power plant during transition between the extended and retracted positions and, while in each of the inserted or extracted states, which can potentially give rise to safety issues, as hot exhaust gas escaping therefrom can potentially cause burn injuries to operators or low origin/high carbon dioxide locations of the combined cycle power plant. Additionally, injector 220 can be exposed to high temperatures during full load operation of gas turbine 116 due to positioning proximate the first location 212, therefore require expensive materials and components to operate reliably. As such, the present inventors have developed diversion systems for a start-up emission converter (also referred to herein as a "start-up converter") that can, for example, locate the emission converter in a stationary position within the exhaust passage.

Figure 4:
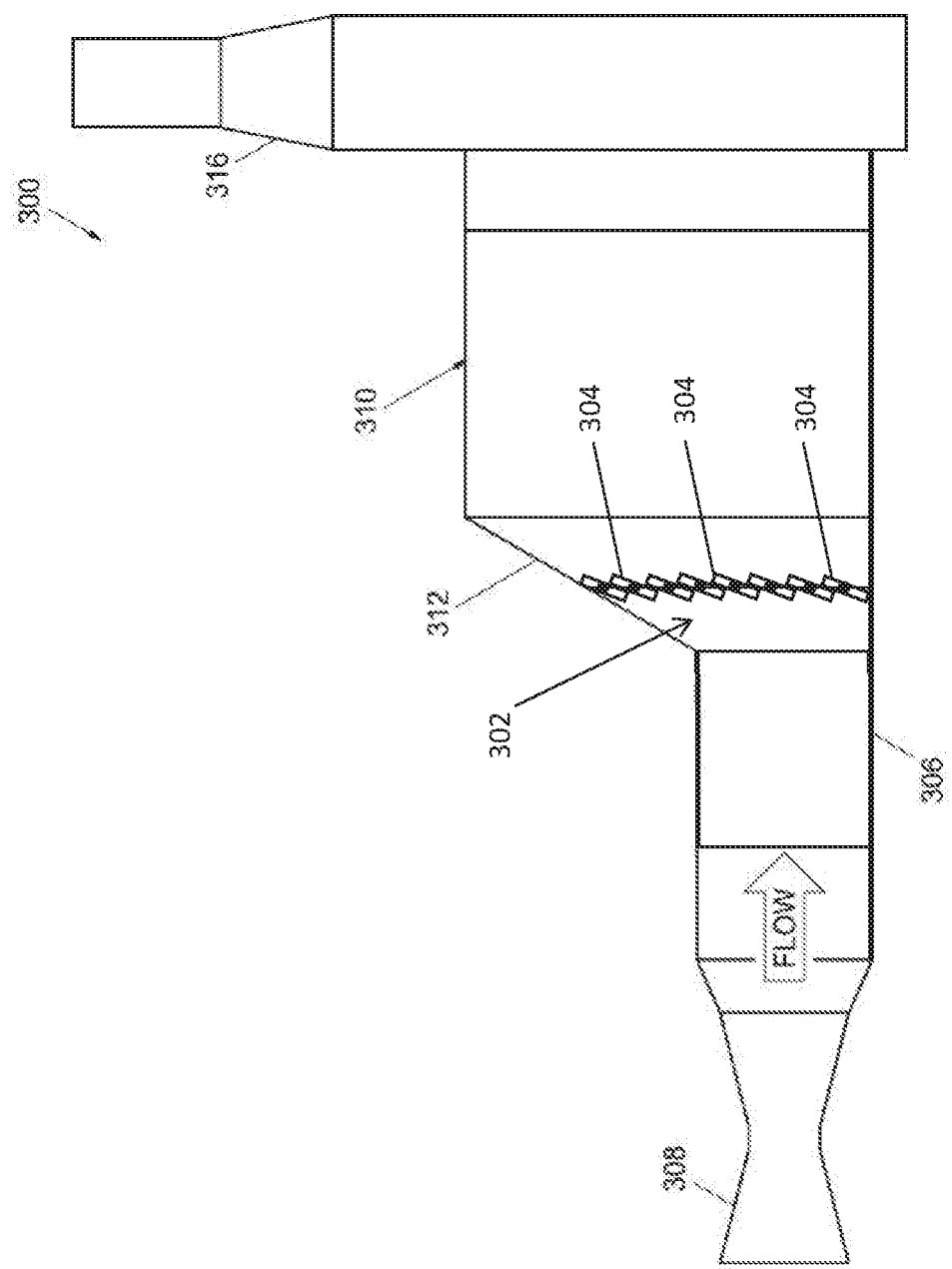
FIG. 4 is a schematic view of a combined cycle power plant incorporating emission louvers of the present application for start-up and low load conditions.

FIG. 4 is a schematic view of combined cycle power plant 300 incorporating emission louver system 302 comprising emission medium panels 304 of the present application that can be used during for low-load or start-up operations of power plant 300. Louver system 302 can be located within or downstream of primary exhaust passage 306 of gas turbine engine 308. Exhaust passage 306 can be coupled to heat recovery steam generator (HRSG) 310 by inlet duct 312. HRSG 310 can include exhaust stack 316. Combined cycle power plant 300 can be configured to operate in the same or similar manner and with the same or similar construction as combined cycle power plant 110 of FIG. 3, but with emission reduction system 200 replaced by louver system 302. For example, HRSG 310 can be constructed similar to HRSG 122 of FIG. 3, and gas turbine engine 308 can be constructed similar to gas turbine system 112 of FIG. 3. Likewise, combined cycle power plant 300 can be configured to operate in conjunction with steam turbine 124 and reductant delivery system 164 of FIG. 3.

Exhaust gas generated by gas turbine engine 308 can be directed sequentially through exhaust passage 306, inlet duct 312, HRSG 310 and exhaust stack 316. Gas turbine engine 308 can be operated to generate rotational shaft power for turning an electrical generator, such as generator 14. The exhaust gas can be directed into exhaust passage 306 where it can be subject to one or more of heating, conditioning or converting before being passed into inlet duct 312 for HRSG 310. HRSG 310 can include various heat exchange components for production and transporting of steam, such as for steam turbine system 16 or steam turbine 124. HRSG 310 can additionally include various components for removing pollutants from the exhaust gas, such as carbon monoxide catalyst 152 and SCR system 154. However, as discussed herein, in order for emissions reductions components to be effective, they must first be heated to a sufficient operating temperature. Due to the thermal mass associated with heat exchange components of HRSG 310 there is some latency in the heating of the emissions reductions components. As such, during start-up of gas turbine engine 308, emissions within the exhaust gas can exceed recommended and government regulated limits.

Louver system 302 of the present application can selectively route exhaust gas of gas turbine engine 308 through a plurality of emission medium panels 304 extending across inlet duct 312, which can be located upstream of the components of HRSG 310. As such, emission medium panels 304 can be heated rapidly to operating temperatures to remove emissions from the exhaust gas while the emissions reductions components located within HRSG 310 can be permitted to come to operating temperatures in due course. Once the exhaust gas temperatures of gas turbine 308 reach a temperature limit of emission medium panels 304, or the emissions reductions components within HRSG 310 are brought up to operating temperatures, louver system 302 of the present application can selectively rotate emission medium panels 304 to permit exhaust gas of gas turbine engine 308 to pass between individual emission medium panels 304 to avoid any potential for exposure above the optimum operating temperature of emission medium panels 304 as well as flow losses associated with incorporating structures such as emission converters within the flow of the exhaust gas, for example. As discussed below, cooling air can be used to maintain emission medium panels 304 below maximum operational temperature limits. Louver system 302 avoids needing to move emission medium panels 304 completely out of exhaust passage 306 or inlet duct 312, thereby mitigating damage to emission medium panels 304, and removing the need for complex motion control and sealing mechanisms. In the embodiment of FIG. 4, emission medium panels 304 can comprise a plurality of elongate sections, boards or planks of material that can itself or can be coated, impregnated, covered with a material that can interact with exhaust gas of gas turbine 308 to remove various toxins, pollutants, chemicals and the like therefrom. Emission medium panels 304 can be porous or perforated to permit exhaust gas to pass therethrough to treat the exhaust gas while permitting continuous flow through inlet duct 312 and into HRSG 310. In various embodiments, emission medium panels 304 can comprise one or more of a selective catalytic reduction (SCR) system, a CO converter and the like. Emission medium panels 304 can comprise a medium or material as appropriate for the types of substance or toxin to be removed, such as one or more of a CO catalyst, an SCR catalyst (to reduce NOx levels) and a multi-pollutant catalyst.

Figure 6:
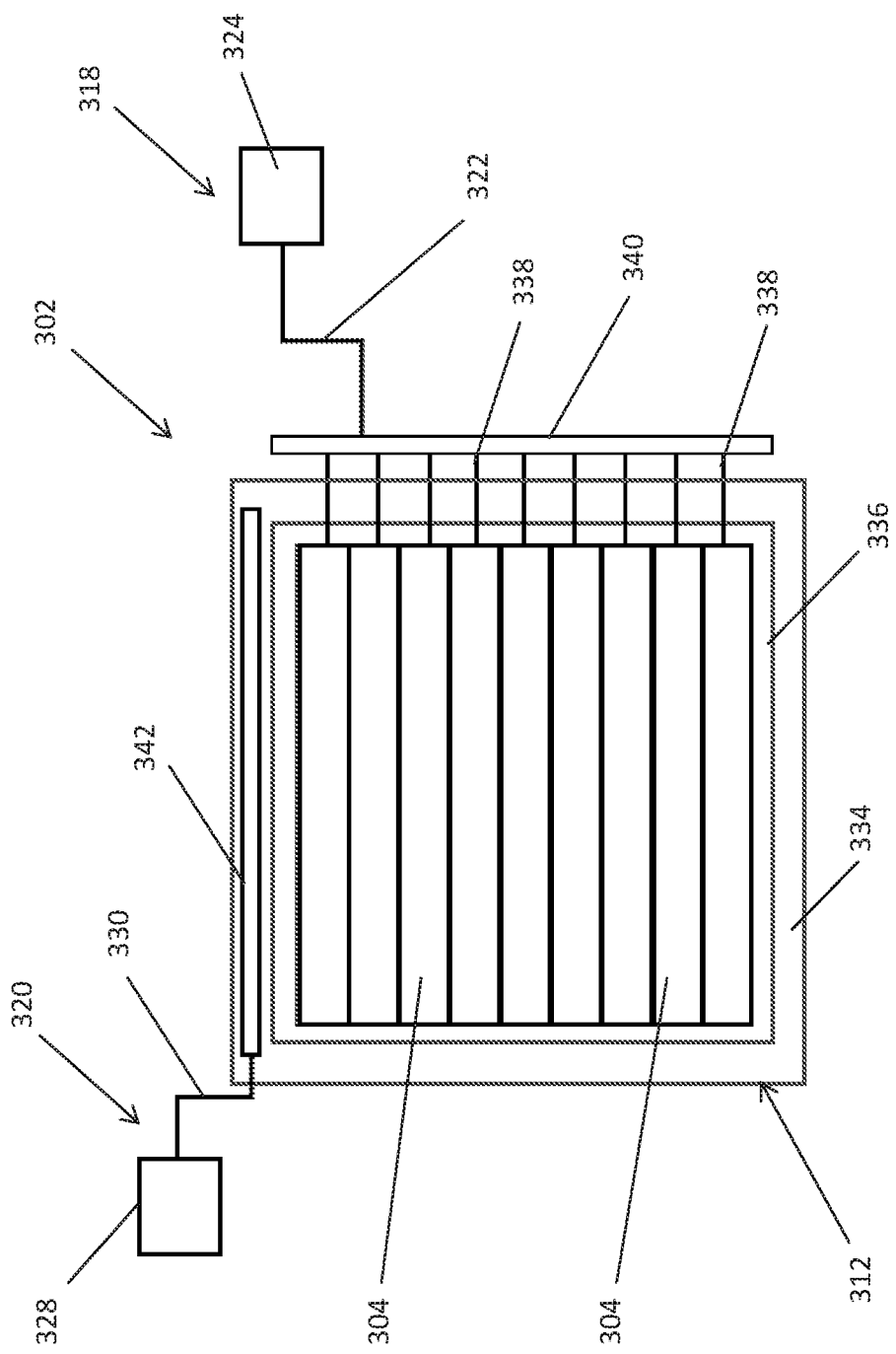
FIG. 6 is a schematic front view of the emission louvers of FIG. 5B illustrating the location of an actuation mechanism and an air injection system.

As discussed with reference to FIGS. 5A and 5B, louver system 302 can include actuation mechanism 318, catalyst injection grid 317 and air injection system 320, as shown in FIGS. 5A-6. Actuation mechanism 318 can rotate emission medium panels 304 between an open position where exhaust gas can pass between emission medium panels 304 and a closed position where exhaust gas can pass through emission medium panels 304. Catalyst injection grid 317 can introduce a reductant to emission panels 304 to facilitate treatment of the exhaust gas. Air injection system 320 can operate outside of the framework of catalyst injection grid 317 to selectively introduce cooling or purging air into louver system 302 or at other locations, such as proximate emission medium panels 304. In embodiments, catalyst injection grid 317 and air injection system 320 can be combined.

FIG. 5A is a schematic view of transition duct 312 of heat recovery steam generator 310 incorporating horizontally mounted emission louver panels 304 of the present application in an open state. FIG. 5B is a schematic view of a transition duct 312 of heat recovery steam generator 310 incorporating horizontally mounted emission louver panels 304 of the present application in a closed state. FIGS. 5A and 5B are discussed concurrently.

Louver system 302 can comprise emission louver panels 304, injection grid 317, actuation mechanism 318 and air injection system 320. Actuation mechanism 318 can comprise linkage 322 and drive 324. Injection grid 317 can comprise fluid transfer device 326. Air injection system 320 can comprise air source 328, air line 330 and valve 332. Transition duct 312 can comprise duct wall 334.

Injection grid 317 can be disposed within duct wall 334 upstream of emission medium panels 304. Embodiments in which emission medium panels 304 include an SCR or multi-pollutant catalyst may use injection grid 317 to inject the reductant as described above. Additionally, injection grid 317 may also (or alternatively) inject cooling air into the duct wall 334 to ensure that a temperature of emission medium panels 304 does not exceed a maximum recommended temperature during those times when louver system 302 routes exhaust gas between emission medium panels 304. Disposition of injection grid 317 within duct wall 334 reduces the need for material and control complexities associated with permanently positioning flow distributer 224 and injector 220 (FIG. 3) within flow of exhaust 118 during steady-state, full load operation. An additional emission louver system 302, such as including CO catalyst panels, can be positioned upstream of injection grid 317. Fluid transfer device 326 can comprise any suitable device or structure for injection catalysts, such as pipes, nozzles, manifolds and the like.

Furthermore, louver system 302 can be provided with air injection system 320 that can operate outside of the framework of injection grid 317 to selectively introduce cooling or purging air into louver system 302 at various locations, such as proximate emission medium panels 304. Valve 332 can be opened when emission medium panels 304 are in the open state to direct cooling air from air source 328 across emission medium panels 304. In various examples, air or gas from air source 328 can be directed from air injection system 320 into louver system 302 for various purposes. Air source 328 can comprise a fan, blower or compressor dedicated to air injections system 320. In various examples, air source 328 can comprise air or gas from the gas turbine engine to which diversion system 302 is connected, e.g., gas turbine engine 308, such as from a high or low pressure compressor stage of the engine. Additionally, air injection system 320 can use recycled exhaust from cooler sections of the HRSG 310. The air or gas can be directed into duct wall 334 to seal out high temperature exhaust gas at emission medium panels 304. The air can be of a temperature that is lower than that of the exhaust gas to both dilute exhaust gas at the surfaces of emission medium panels 304 and cool the surfaces of emission medium panels 304. Air or gas expended by air injection system 320 can then enter the flow of exhaust gas within the remainder of the system. In additional embodiments, air can be injected into the interior of emission medium panels 304.

Louver system 302 can be operated by actuation mechanism 318 to selectively route exhaust gas flow through emission medium panels 304 or between emission medium panels 304. As shown in FIG. 5A, emission medium panels 304 can be rotated to an open position such that width W is rotated to have a substantially horizontal orientation. In embodiments, the substantially horizontal orientation can be plus or minus forty-five degrees to horizontal, which is commensurate with the direction of the bulk flow of exhaust gas. Emission medium panels 304 can thus permit exhaust gas to pass into HRSG 310 without negatively impacting exhaust gas flow. Furthermore, emission medium panels 304 can be oriented to enhance exhaust gas flow, such as by diffusing the flow of the exhaust gas throughout inlet duct 312, slowing the flow of the exhaust gas from exhaust passage 306, and preventing the natural buoyancy of the hot exhaust gas from stratifying. Emission medium panels 304 can be mounted to duct wall 334 via a frame (see ame 336 of FIG. 6) and as such emission medium panels 304 can individually be framed such that edge E that defines a thickness of each panel can be protected from hot gas flow. Emission medium panels 304 can have any requisite thickness for the desired emission reduction being carried out thereby.

As shown in FIG. 5B, emission medium panels 304 can be rotated to a dosed position such that width W is rotated to have a substantially vertical orientation. In embodiments, the substantially vertical orientation can be plus or minus twenty-five degrees to vertical, which is commensurate with a direction perpendicular to the bulk flow direction of flow of exhaust gas. In the closed or substantially vertical orientation, emission medium panels 304 can be arranged end-to-end as shown in FIG. 5B or can overlap as shown in FIG. 4. Emission medium panels 304 can thus permit exhaust gas to pass into HRSG 310 after passing through emission medium panels 304, to thereby permit emission medium panels 304 to perform emission reducing interactions with the exhaust gas. Valve 332 can be closed when emission medium panels 304 are in the closed state so as to not introduce cooling air to emission medium panels 304 that might limit emission-reducing capabilities of emission medium panels 304.

Emission medium panels 304 can be mounted to duct wall 334 or a frame mounted to duct wall 334, via any suitable pivoting mechanisms, such as hinge points 336. Emission medium panels 304 can be operatively coupled to actuation mechanism 318 to move between the open and closed positions. In various examples, actuation mechanism 318 can comprise any suitable means for moving or rotating emission medium panels 304. For example, drive 324 can comprise a hydraulic cylinder and linkage 322 can comprise a piston rod coupled to actuation arms connected to emission medium panels 304. In another example, drive 324 can comprise a motor and linkage 322 can comprise a chain, and emission medium panels 304 can include sprockets such that the chain can be pulled by drive 324 to rotate emission medium panels 304 within exhaust inlet duct 312, In another example, drive 324 can comprise a motor and linkage 322 can comprise a jack screw rotated by the motor, and emission medium panels 304 can comprise a threaded member, such as a nut, to engage the jack screw.

Emission medium panels 304 can be located completely within inlet duct 312 such that operation of emission medium panels 304 does not produce an opening within sealed ductwork from which exhaust gas can escape. For example, only a single simple through-bore for linkage 322 can be included in the ductwork. In other examples, drive 324 can be included inside the ductwork such that no openings are produced in the ductwork for the actuators.

FIG. 6 is a schematic front view of emission louver system 302 of FIG. 5B illustrating the location of an actuation mechanism 318 and air injection system 320. FIG. 6 additionally illustrates emission medium panels 304 extending horizontally across inlet duct 312. For example, emission medium panels 304 can have a major axis length that extends substantially all the way across inlet duct 312 within frame 336. Emission medium panels 304 can be mounted within frame 336, which can be mounted to duct wall 334 in inlet duct 312. Spindles or axles 338 of emission medium panels 304 can extend through frame 336 to join to linkage 322 via linkage 340 to form hinge points 336. In an embodiment, linkage 340 can be located outside of duct wall 334, as illustrated. In another embodiment, linkage 340 can be located between frame 336 and duct wall 334. In other embodiments, frame 336 can be omitted and emission medium panels 304 can be mounted directly to duct wall 334 using, for example, spindles 338.

Air injection system 320 can couple to manifold 342 via air line 330. Manifold can be located on duct wall 334, frame 336 or therebetween. Manifold 342 can include perforations or nozzles to discharge air across emission medium panels 304. FIG. 6 illustrates a single manifold, but multiple manifolds can be used. In other embodiments, a grid of injection nozzles can be used.

Figure 7:
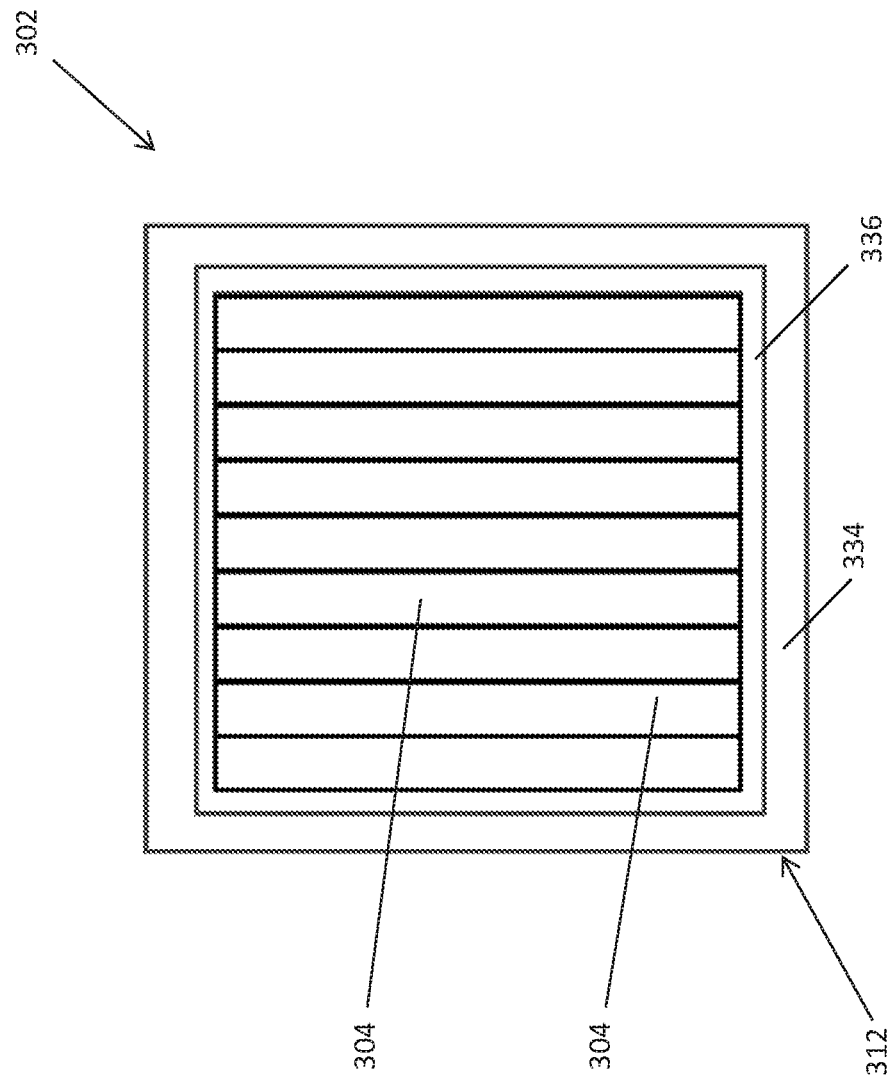
FIG. 7 is a schematic front view of another embodiment of emission louvers mounted within an exhaust duct in a longitudinal orientation.

FIG. 7 is a schematic front view of another embodiment of emission medium panels 304 of louver system 302 mounted within inlet duct 312 in a longitudinal orientation. Louver system 302 of FIG, 7 can additionally include injection grid 317, actuation mechanism 318 and air injection system 320, as discussed with reference to FIGS. 5A-6. Longitudinally oriented emission medium panels 304 can be beneficial in guiding exhaust gas into HRSG 310 to provide lateral, side-to-side guidance of the exhaust gas flow without disturbing longitudinal, up-and-down flow.

It will be appreciated that while an injection grid (e.g., injection grid 317) has been depicted and described in conjunction with less than all of the embodiments herein, its use may be applicable with any of the embodiments herein to cool the stationary emissions converter while hot exhaust gasses are routed around the stationary emissions converter through the remainder of the exhaust duct. Additionally, use of the injection grid 317 may be applicable to inject reductant with any of the embodiments described herein that have an emissions converter including at least one of an SCR and a multi-pollutant converter.

The systems and methods discussed in the present application can be useful in safely, feasibly and inexpensively reducing start-up emissions in combined cycle power plants without sacrificing performance at high and full load operating conditions. The louver systems described herein can take advantage of the mechanical simplicity of not needing additional duct work or actuation mechanisms to insert and withdraw emission converters or emission medium panels from an exhaust duct. As such, the emission medium panels do not need to be moved and are not subject to wear and damage associated with repeated displacement. Furthermore, actuation mechanisms to pivot emission medium panels in place between open and closed orientations can be simplified compared to alternative designs. For example, it is simple and easy to seal pivoting emission medium panels within existing duct work of the power plant.

VARIOUS NOTES & EXAMPLES

Example 1 can include or use subject matter such as an emissions reduction system for a combined cycle power plant having a gas turbine engine and a heat recovery steam generator (HRSG) that can comprise a duct defining a flow space configured to receive exhaust gas from the gas turbine and convey the exhaust gas into the HRSG, and a louver system coupled to the duct that can comprise a plurality of emission medium panels extending across the flow space, the emission medium panels configured to be moved between a first position where adjacent filter medium panels extend contiguously across the flow space of the duct and a second position where adjacent filter medium panels include spaces therebetween to provide an unobstructed flow path, and an actuator to move the plurality of panels between the first position and the second position.

Example 2 can include, or can optionally be combined with the subject matter of Example 1, to optionally include a louver system further comprising a cooling air injector configured to inject cooling air onto the plurality of emission medium panels.

Example 3 can include, or can optionally be combined with the subject matter of one or any combination of Examples 1 or 2 to optionally include a cooling air injector that is configured to receive cooling air from the gas turbine engine.

Example 4 can include, or can optionally be combined with the subject matter of one or any combination of Examples 1 through 3 to optionally include a plurality of emission medium panels comprising elongate panels extending across the flow space within the duct in one of the following orientations: horizontally and vertically.

Example 5 can include, or can optionally be combined with the subject matter of one or any combination of Examples 1 through 4 to optionally include individual panels of the plurality of emission medium panels comprising a length extending across the flow space, a width having a first dimension and a thickness having a second dimension less than the first dimension, wherein in the first position the width faces toward incoming exhaust gas and in the second position the thickness faces toward incoming exhaust gas.

Example 6 can include, or can optionally be combined with the subject matter of one or any combination of Examples 1 through 5 to optionally include a plurality of emission medium panels that are configured to overlap in the first position such that the exhaust gas flows through individual panels of the plurality of emission medium panels.

Example 7 can include, or can optionally be combined with the subject matter of one or any combination of Examples 1 through 6 to optionally include a plurality of emission medium panels that are configured to be in a range of plus or minus forty-five degrees to horizontal in the second position such that the exhaust gas flows between individual panels of the plurality of emission medium panels.

Example 8 can include, or can optionally be combined with the subject matter of one or any combination of Examples 1 through 7 to optionally include a duct that comprises an inlet diffuser duct for the HRSG, the inlet diffuser duct increasing in cross-sectional flow area from the gas turbine engine to the HRSG.

Example 9 can include, or can optionally be combined with the subject matter of one or any combination of Examples 1 through 8 to optionally include an actuator that is located outside of the duct.

Example 10 can include, or can optionally be combined with the subject matter of one or any combination of Examples 1 through 9 to optionally include a plurality of emission medium panels that comprise CO or NOx catalyst panels.

Example 11 can include or use subject matter such as a method for controlling emissions during low load conditions of a gas turbine engine used in a combined cycle power plant that can comprise starting the gas turbine engine that generates an exhaust gas flow, directing the exhaust gas flow of the gas turbine engine through a primary passage of an exhaust duct coupled to a heat recovery steam generator (HRSG), closing a plurality of emission medium louvers to a closed state to increase exposure of the plurality of emission medium louvers to the exhaust gas flow, attaining a threshold operation parameter of the combined cycle power plant and opening the plurality of emission medium louvers to an open state to decrease exposure of the plurality of emission medium louvers to the exhaust gas flow.

Example 12 can include, or can optionally be combined with the subject matter of Example 11, to optionally include supplying cooling air to the plurality of emission medium louvers.

Example 13 can include, or can optionally be combined with the subject matter of one or any combination of Examples 11 or 12 to optionally include supplying cooling air to the plurality of emission medium louvers by injecting cooling air across the plurality of emission medium louvers in the open state.

Example 14 can include, or can optionally be combined with the subject matter of one or any combination of Examples 11 through 13 to optionally include supplying cooling air from the gas turbine engine to the plurality of emission medium louvers.

Example 15 can include, or can optionally be combined with the subject matter of one or any combination of Examples 11 through 14 to optionally include closing the plurality of emission medium louvers comprising overlapping individual panels of the plurality of emission medium louvers in the closed state.

Example 16 can include, or can optionally be combined with the subject matter of one or any combination of Examples 11 through 15 to optionally include diffusing the exhaust gas flow within an inlet duct of the HRSG when the plurality of emission medium louvers are in the open sate.

Example 17 can include, or can optionally be combined with the subject matter of one or any combination of Examples 11 through 16 to optionally include opening the plurality of emission medium louvers by disposing individual panels of the plurality of emission medium louvers substantially parallel to a wall of the inlet duct, the wall of the inlet duct disposed at an oblique angle to a bulk flow direction of the exhaust gas.

Example 18 can include, or can optionally be combined with the subject matter of one or any combination of Examples 11 through 17 to optionally include opening or closing the plurality of emission medium louvers by rotating individual panels of the plurality of emission medium louvers along horizontal or vertical axes extending through the inlet duct.

Example 19 can include, or can optionally be combined with the subject matter of one or any combination of Examples 11 through 18 to optionally include actuating the plurality of emission medium louvers between the open and closed states via an actuator from outside the exhaust duct.

Example 20 can include, or can optionally be combined with the subject matter of one or any combination of Examples 11 through 19 to optionally include a plurality of emission medium panels comprising CO or NOx catalyst panels.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein, In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An emissions reduction system for a combined cycle power plant having a gas turbine engine and a heat recovery steam generator (HRSG), the emissions reduction system comprising:
    a duct defining a flow space configured to receive exhaust gas from the gas turbine and convey the exhaust gas into the HRSG; and
    a louver system coupled to the duct, the louver system comprising:
        a plurality of emission medium panels extending across the flow space, the emission medium panels configured to be moved between a first position where adjacent emission filter medium panels extend contiguously across the flow space of the duct such that the exhaust gas flows through the emission medium panels and a second position where adjacent emission filter medium panels extend contiguously across the flow space of the duct and include spaces therebetween such that the exhaust gas flows around the emission medium panels;
        an actuator to move the plurality of panels between the first position and the second position; and
        wherein the plurality of emission medium panels comprises catalyst panels.

2. The emissions reduction system of claim 1, wherein the louver system further comprises a cooling air injector configured to inject cooling air onto the plurality of emission medium panels.

3. The emissions reduction system of claim 2, wherein the cooling air injector is configured to receive cooling air from the gas turbine engine.

4. The emissions reduction system of claim 1, wherein the plurality of emission medium panels comprises elongate panels extending across the flow space within the duct in one of the following orientations: horizontally and vertically.

5. The emissions reduction system of claim 1, wherein individual panels of the plurality of emission medium panels comprise:
    a length extending across the flow space;
    a width having a first dimension; and
    a thickness having a second dimension less than the first dimension;
    wherein in the first position the width faces toward incoming exhaust gas and in the second position the thickness faces toward incoming exhaust gas.

6. The emissions reduction system of claim 1, wherein the plurality of emission medium panels are configured to overlap in the first position such that the exhaust gas flows through individual panels of the plurality of emission medium panels.

7. The emissions reduction system of claim 1, wherein the plurality of emission medium panels are configured to be in a range of plus or minus forty-five degrees to horizontal in the second position such that the exhaust gas flows between individual panels of the plurality of emission medium panels.

8. The emissions reduction system of claim 1, wherein the duct comprises an inlet diffuser duct for the HRSG, the inlet diffuser duct increasing in cross-sectional flow area from the gas turbine engine to the HRSG.

9. The emissions reduction system of claim 1, wherein the actuator is located outside of the duct.

10. The emissions reduction system of claim 1, wherein the plurality of emission medium panels comprises CO or NOx catalyst panels.

11. A method for controlling emissions during low load conditions of a gas turbine engine used in a combined cycle power plant, the method comprising:
    starting the gas turbine engine that generates an exhaust gas flow;
    directing the exhaust gas flow of the gas turbine engine through a primary passage of an exhaust duct coupled to a heat recovery steam generator (HRSG);
    rotating each of a plurality of emission medium louvers about major axes extending substantially across the exhaust duct to a closed state to increase exposure of the plurality of emission medium louvers to the exhaust gas flow;
    attaining a threshold operation parameter of the combined cycle power plant; and
    rotating each of the plurality of emission medium louvers about the major axes to an open state to decrease exposure of the plurality of emission medium louvers to the exhaust gas flow;
    wherein the emission medium panels are exposed to the exhaust gas flow in the closed state and the open state; and wherein the plurality of emission medium panels comprises catalyst panels.

12. The method of claim 11, further comprising supplying cooling air to the plurality of emission medium louvers.

13. The method of claim 12, wherein supplying cooling air to the plurality of emission medium louvers further comprises injecting cooling air across the plurality of emission medium louvers in the open state.

14. The method of claim 12, further comprising supplying cooling air from the gas turbine engine to the plurality of emission medium louvers.

15. The method of claim 11, wherein closing the plurality of emission medium louvers comprises overlapping individual panels of the plurality of emission medium louvers in the closed state.

16. The method of claim 11, further comprising diffusing the exhaust gas flow within an inlet duct of the HRSG when the plurality of emission medium louvers are in the open state.

17. The method of claim 11, wherein opening the plurality of emission medium louvers comprises disposing individual panels of the plurality of emission medium louvers substantially parallel to a wall of the inlet duct, the wall of the inlet duct disposed at an oblique angle to a bulk flow direction of the exhaust gas.

18. The method of claim 11, wherein opening or closing the plurality of emission medium louvers comprises rotating individual panels of the plurality of emission medium louvers along horizontal or vertical axes extending through the exhaust duct.

19. The method of claim 11, further comprising actuating the plurality of emission medium louvers between the open and closed states via an actuator from outside the exhaust duct.

20. The method of claim 11, wherein the plurality of emission medium panels comprises CO or NOx catalyst panels.

* * * * *